(12) United States Patent
Voyce et al.

(10) Patent No.: US 12,543,728 B2
(45) Date of Patent: Feb. 10, 2026

(54) PRECISION OXYGEN FLOW CONTROL FOR ORGAN PERFUSION SYSTEMS

(71) Applicant: ORGANOX LIMITED, Oxford (GB)

(72) Inventors: Daniel Voyce, Bicester (GB); Constantin Coussios, Oxford (GB)

(73) Assignee: ORGANOX LIMITED, Oxford (GB)

( * ) Notice: Subject to any disclaimer, the term of this patent is extended or adjusted under 35 U.S.C. 154(b) by 449 days.

(21) Appl. No.: 18/253,079

(22) PCT Filed: Nov. 23, 2021

(86) PCT No.: PCT/GB2021/053026
§ 371 (c)(1),
(2) Date: May 16, 2023

(87) PCT Pub. No.: WO2022/112746
PCT Pub. Date: Jun. 2, 2022

(65) Prior Publication Data
US 2024/0000063 A1 Jan. 4, 2024

(30) Foreign Application Priority Data
Nov. 24, 2020 (GB) ................................ 2018460

(51) Int. Cl.
*A01N 1/126* (2025.01)
*A01N 1/143* (2025.01)

(52) U.S. Cl.
CPC ............ *A01N 1/126* (2025.01); *A01N 1/143* (2025.01)

(58) Field of Classification Search
CPC .............................. A01N 1/126; A01N 1/143
See application file for complete search history.

(56) References Cited

U.S. PATENT DOCUMENTS

| 4,212,297 A | * | 7/1980 | Frosch .............. A61M 16/0465 |
| | | | 128/207.14 |
| 2012/0178150 A1 | | 7/2012 | Tempelman et al. |
| 2014/0017658 A1 | | 1/2014 | Steinman et al. |

FOREIGN PATENT DOCUMENTS

| EP | 1168913 | | 10/2000 | |
| GB | 1570917 A | * | 7/1980 | .............. A61M 1/32 |
| JP | 2020531091 A | * | 11/2020 | .......... A61M 1/3623 |
| WO | 0060936 A1 | | 10/2000 | |
| WO | 2004101021 A2 | | 11/2004 | |

(Continued)

OTHER PUBLICATIONS

Machine translation of JP-2020531091-A, 32 pages. (Year: 2020).*
United Kingdom Search Report dated May 4, 2021.

*Primary Examiner* — Aaron J Kosar
(74) *Attorney, Agent, or Firm* — William J. Clemens; Shumaker, Loop & Kendrick, LLP

(57) ABSTRACT

A perfusion system for the extracorporeal perfusion of an organ comprises a perfusion fluid circuit (100) for circulating perfusion fluid through the organ, oxygenation means (104) for adding oxygen into the perfusion fluid and having an oxygen inlet (126), an oxygen concentrator (140) having an oxygen outlet (144), a plenum chamber (148) connected to the outlet of the oxygen concentrator and to the oxygen inlet of the oxygenation means, a flow control valve (160) arranged to control the flow of oxygen from the plenum chamber to the oxygenation means, and a controller (166) arranged to control the flow control valve (160) thereby to control the rate of flow of oxygen to the oxygenation means (104).

13 Claims, 2 Drawing Sheets

(56) References Cited

FOREIGN PATENT DOCUMENTS

| WO | 2009132018 | A1 | 10/2009 |
|----|------------|----|---------|
| WO | 2013068753 | A1 | 5/2013 |
| WO | 2014041370 | A1 | 3/2014 |
| WO | 2021044194 | A1 | 3/2021 |

* cited by examiner

PRECISION OXYGEN FLOW CONTROL FOR ORGAN PERFUSION SYSTEMS

FIELD OF THE INVENTION

The present invention relates to oxygen supplies for perfusion systems for bodily organs, in particular small organs such as the human kidney, spleen and pancreas.

BACKGROUND TO THE INVENTION

It is known, for example from EP 1 168 913, to provide a system for extracorporeal organ perfusion in which a human or non-human organ can be preserved, for example prior to transplant into a patient. The system typically comprises a reservoir for perfusion fluid (or perfusate), which may be blood or another perfusion solution, and a circuit for circulating the fluid through the organ. The circuit typically also comprises an oxygenator or other device for adding oxygen, carbon dioxide, or other substances into the blood, from a source which typically comprises a pressurized gas cylinder.

It is also known, for example from WO2013/068753, to use an oxygen concentrator to supply oxygen to the oxygenator of an organ perfusion system. This has the advantage of being lighter and more portable than a gas cylinder, as well as having the ability to produce an effectively unlimited supply of oxygen.

Much is known about oxygen requirements of the entire human body, but normothermic preservation of individual organs in a functioning state requires the delivery of very small quantities of oxygen, typically using much smaller oxygen delivery rates than those achievable by whole-patient oxygen delivery devices. This is a challenge for all isolated organs likely to be machine perfused, but is particularly the case for organs of lesser tissue mass, including the kidney, spleen and pancreas. For those organs, oxygen demand is typically in the range of 10-50 ml/min, significantly less than the 100-5000 ml/min typically delivered in conventional cardiopulmonary bypass circuits in common clinical use to oxygenate whole patients. Because of this very low oxygen demand, even minor fluctuations in the oxygen delivery rate result in large, non-physiological fluctuations in the oxygen content (pO2) of the perfusate, potentially causing preservation injury through production of free radicals (over oxygenation) or ischaemia (under oxygenation). There is therefore a need for a high-accuracy, low-power-consumption system for delivering physiological amounts of oxygen to solid organs, particularly in the context of hypothermic or normothermic machine perfusion.

SUMMARY OF THE INVENTION

The present invention provides a perfusion system for the perfusion of an organ, the system comprising a perfusion fluid circuit for circulating perfusion fluid through the organ, oxygenation means for adding oxygen into the perfusion fluid and having an oxygen inlet, an oxygen source, for example an oxygen concentrator, having an oxygen outlet, a plenum chamber connected to the outlet of the oxygen source and to the oxygen inlet of the oxygenation means, a flow control means, for example one or more valves, arranged to control the flow of oxygen from the plenum chamber to the oxygenation means, and a controller arranged to control the flow control means thereby to control the rate of flow of oxygen to the oxygenation means.

The controller may be arranged to control operation of the oxygen concentrator thereby to control the rate of flow of oxygen from the oxygen concentrator to the plenum chamber. For example the oxygen concentrator may comprise a compressor and the controller may be arranged to control the compressor thereby to control the rate of flow of oxygen from the oxygen concentrator to the plenum chamber. The compressor may be arranged to pump air into the oxygen concentrator.

Alternatively, or in addition, the system may further comprise a further flow control means, such as a flow control valve, arranged to control the flow of oxygen from the oxygen concentrator to the plenum chamber, and the controller may be arranged to control the further flow control means thereby to control the flow of oxygen from the oxygen concentrator to the plenum chamber.

The system may further comprise an oxygen pressure sensor arranged to measure the pressure of oxygen in the plenum chamber. The oxygen pressure sensor may be connected to the controller. The controller may be arranged to control the oxygen concentrator so as to control the pressure of oxygen in the plenum chamber.

The perfusion circuit may comprise an oxygen measuring means for measuring the oxygen content of the perfusion fluid. The controller may be connected to the oxygen measuring means. The controller may be arranged to control the flow rate of oxygen to the oxygenation means in response to the measured oxygen content.

The plenum chamber may have a volume in the range from 25 ml to 250 ml.

The controller may be arranged to control the rate of flow of oxygen to the oxygenation means down to a minimum of no more than 1 ml/min.

The invention further provides a method of perfusing an organ, the method comprising: pumping perfusion fluid through oxygenation means and through the organ; pumping oxygen into a plenum chamber; and controlling the flow of oxygen from the plenum chamber to the oxygenation means therefore to control the oxygen content of the perfusion fluid.

The method may further comprise measuring the oxygen content of the perfusion fluid. Controlling the flow of oxygen from the plenum chamber to the oxygenation means may be in response to the measured oxygen content.

Pumping oxygen into the plenum chamber may comprise controlling the operation of an oxygen concentrator thereby to control the flow of oxygen into the plenum chamber, for example by controlling a compressor of the oxygen concentrator.

The method may further comprise measuring the pressure of oxygen in the plenum chamber. The oxygen concentrator may be controlled in response to the measured pressure of oxygen, for example being arranged to keep the measured pressure within a predetermined range.

The system may further comprise, in any combination, any one or more features of the preferred embodiments of the invention which will now be described by way of example only with reference to the accompanying drawings.

DETAILED DESCRIPTION

Figure 1:
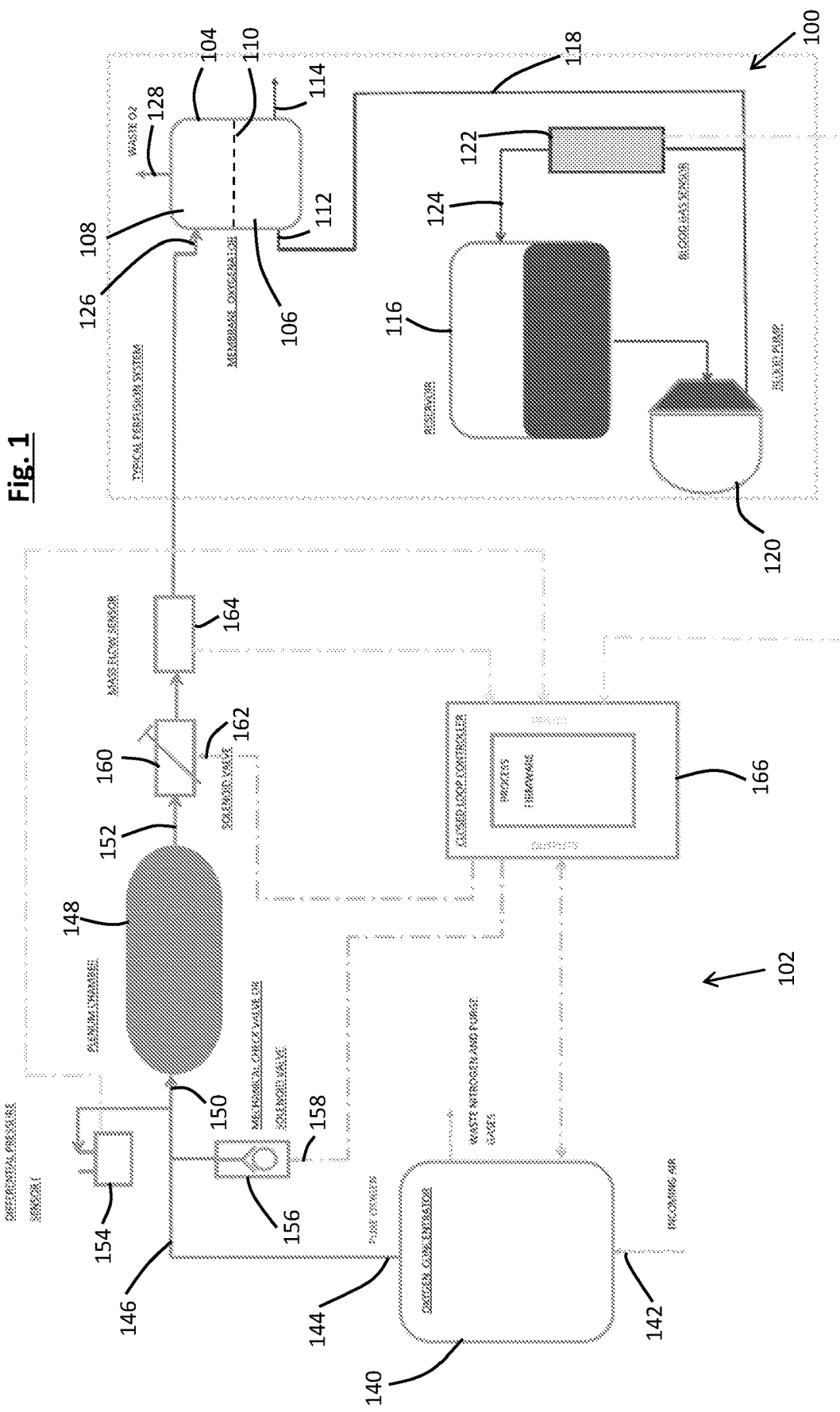
FIG. 1 is a schematic diagram of a perfusion system according to an embodiment of the invention.

Referring to FIG. 1, a perfusion system according to an embodiment of the invention generally comprises a perfusion circuit 100 through which perfusion fluid is circulated, and into which the organ can be connected for perfusion, and an oxygen supply system 102 which supplies oxygen to an oxygenator 104 which forms part of the perfusion circuit 100.

The oxygenator 104 has a perfusion fluid channel 106 through which perfusion fluid can flow, and an oxygen channel 108 through which oxygen can flow, the two channels 106, 108 being separated by a membrane 110 which allows oxygen to pass into the perfusion fluid to oxygenate the perfusion fluid. The perfusion channel 106 has an inlet 112 and an outlet 114 which is connected directly or indirectly to the organ when the system is in use. The perfusion circuit typically further comprises a perfusion fluid reservoir 116 connected to the inlet 112 of the oxygenator via a perfusion fluid supply duct 118, and a perfusion fluid pump 120 connected into the perfusion fluid supply duct 118 and arranged to pump perfusion fluid from the reservoir 116 through the oxygenator 104 to the organ. It may also comprise a perfusion fluid return duct (not shown) arranged to carry perfusion fluid from the organ back to the pump or reservoir. Various sensors may be arranged to sense parameters of the perfusion fluid in the perfusion circuit, and in particular these may include an oxygen sensor arranged to measure the oxygen content of the perfusion fluid in the perfusion circuit. Such a sensor will typically sit across a high pressure and a low pressure point in the perfusion circuit, so as to enable flow past the sensor. For example a blood gas sensor 122 may be provided in a sensing duct 124 which is connected between the outlet 126 of the pump 120 and the reservoir, or between the outlet 114 of the oxygenator and the inlet of the pump 120, so as to bypass the organ.

The oxygen channel 108 of the oxygenator has an oxygen inlet 126 which is connected to the oxygen supply system 102, and an oxygen outlet 128 for waste oxygen.

The oxygen supply system 102 comprises an oxygen concentrator 140 having an inlet 142 for air and an outlet 144 for pure oxygen. The outlet 144 is connected via an oxygen supply duct 146 to the oxygenator 104. A plenum chamber 148 is connected into the oxygen supply duct, having an inlet 150 connected to the oxygen concentrator 140 and an outlet 152 connected to the oxygen inlet 126 so that oxygen flowing from the oxygen concentrator 140 to the oxygenator 104 passes through the plenum chamber 148. A pressure sensor 154 is connected to the inlet 150 to the plenum chamber 148 and is arranged to measure the pressure of the oxygen in the plenum chamber 148 and output an oxygen pressure signal indicative of that pressure. For example the pressure sensor 154 may comprise a differential pressure sensor arranged to measure the difference between the pressure at the plenum chamber inlet 150 and atmospheric pressure. A pressure release valve 156 is connected to the oxygen supply duct 146, for example just upstream of the pressure sensor 154. The pressure release valve 156 may be a solenoid valve having an electrical control input 158 arranged to receive a control signal to control the degree of opening of the valve, or it may be a mechanical check valve having a set pressure at which it will open.

A flow control valve 160 is provided in the oxygen supply duct 146 between the plenum chamber 148 and the oxygenator. This is typically a solenoid valve having a control input 162 arranged to receive a flow control signal and arranged to vary the rate of flow of oxygen from the plenum chamber 148 to the oxygenator 104 in response to variations in the flow control signal. An oxygen flow sensor 164 is also provided in the oxygen supply duct 146, for example between the plenum chamber 148 and the oxygenator, and preferably downstream of the oxygen flow control valve 160, and arranged to generate a flow rate signal indicative of the rate of flow, typically by mass, of oxygen from the plenum chamber 148 to the oxygenator 104.

Figure 2:
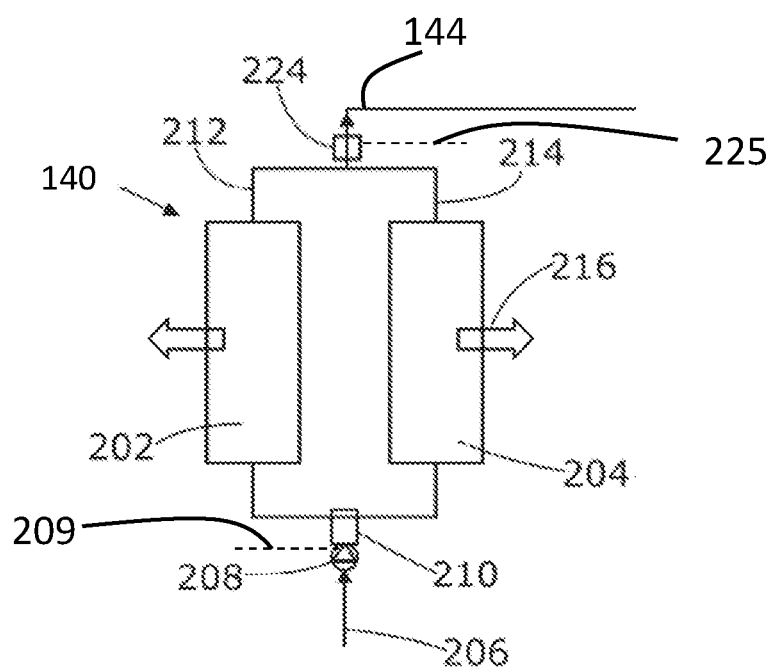
FIG. 2 is a schematic diagram of an oxygen concentrator forming part of the system of FIG. 1.

Referring to FIG. 2, the oxygen supply to the oxygen concentrator 140 comprises a pair of zeolite towers 202, 204, an air inlet 206 arranged to receive gas in the form of air at atmospheric pressure, a compressor 208 arranged in the inlet to compress the incoming air and pump it into the oxygen concentrator, and a two way switch valve 210 operable to control the flow of incoming air into the zeolite towers 202, 204. Each of the towers 202, 204 has an outlet 212, 214 and these are connected together to form the outlet 144 from the oxygen concentrator. In use, as the compressed air flows through the zeolite towers 202, 204, the zeolite extracts nitrogen from the air which increases the concentration of oxygen in the gas. The nitrogen leaves the towers via vents 216, and the gas leaving the concentrator 140 through its outlet 144 comprises concentrated oxygen as well as some nitrogen and traces of other gases. A flow control valve, such as a proportional valve 224, in the outlet 144 from the oxygen concentrator is arranged to control the flow rate of gas, and hence oxygen, from the oxygen concentrator 140 to the plenum chamber 148. The proportional valve 224 has a control input 225 arranged for input of a control signal to control the degree of opening of the flow control valve, and the compressor 208 has a control input 209 arranged for input of a control signal to control the speed of the compressor.

Referring back to FIG. 1, a controller 166 is arranged to control operation of the oxygen supply system. The controller 166 is connected to the pressure release valve 158, and the flow control valve 160 and arranged to generate control signals which are input to their respective inputs 158, 162. The controller 166 is also connected to the control input 209 of the compressor 208 and control input 225 of the flow control valve 224. The controller 166 is therefore arranged to control the flow rate of oxygen into the plenum chamber 148, as well as the flow rate of oxygen from the plenum chamber 148 to the oxygenator 104. The controller 144 is also connected to the pressure sensor 154 so that it can measure the pressure of oxygen in the plenum chamber 148, and to the oxygen flow sensor 164 so that it can measure the rate of flow of oxygen from the plenum chamber 148 to the oxygenator 104. The controller 166 is also connected to the blood gas sensor 122 so that it can monitor the oxygen content pO2 of the perfusion fluid during perfusion of the organ, and provide closed loop control of the supply of oxygen to the oxygenator so as to control the oxygen content of the perfusion fluid.

The dimensions and operating parameters of the system will vary depending on the organ to be perfused. The volume of the plenum chamber may be for example in the range from 25 ml to 250 ml. The maximum flow rate of oxygen to the oxygenator 104 may be in the range from 20 to 100 ml/min. The minimum controlled flow rate of oxygen to the oxygenator may be no more than 5 ml/min, or no more than 1 ml/min. For example the system may be able to control the oxygen flow rate to between 1 and 50 ml/min.

In operation, the perfusion fluid pump 120 pumps perfusion fluid around the perfusion circuit 100, through the organ and through the oxygenator 104. The oxygen sensor 122 senses the oxygen concentration in the perfusion fluid, and the controller 166 monitors that oxygen concentration, and controls the oxygen supply circuit so as to maintain the oxygen concentration within a predetermined range.

The controller 166 is arranged to control the oxygen concentration in the perfusion fluid by controlling the rate of flow of oxygen through the oxygenator 104. That rate of flow is dependent on the pressure of the oxygen in the plenum chamber 148 and the degree of opening of the oxygen flow control valve 160. For example the pressure in the plenum chamber may be maintained within a predetermined range, for example 0.5 to 1.5 bar and the oxygen flow control valve controlled by the controller 166, in response to the measured oxygen flow rate as measured by the oxygen flow rate sensor 164, so as to provide a target oxygen flow rate. In order to maintain the oxygen pressure within the plenum chamber 148 within the required range, the controller is arranged to measure the pressure in the plenum chamber using the oxygen pressure sensor 154, and to control the oxygen concentrator 140 in response, for example by controlling the speed of the compressor 208 and/or the degree of opening of the flow control valve 224. The ability to reduce the compressor speed and duty cycle results in significant energy savings, reducing power consumption particularly for transportable organ preservation devices. The pressure release valve 156 is set, or controlled, so as to open at a set pressure which is the maximum pressure to which the plenum chamber 148 can safely be pressurised. That may be at the top end of the pressure range within which the oxygen pressure in the plenum chamber 148 is maintained, but is typically higher than that so the pressure release valve only opens if some fault causes an undesirable increase in oxygen pressure.

The invention claimed is:

1. A perfusion system for the perfusion of an organ, the system comprising a perfusion fluid circuit configured to circulate perfusion fluid through the organ, an oxygenator configured to add oxygen into the perfusion fluid and having an oxygen inlet, an oxygen concentrator having an oxygen outlet, a plenum chamber connected to the outlet of the oxygen concentrator and to the oxygen inlet of the oxygenator, a flow control valve configured to control a flow of oxygen from the plenum chamber to the oxygenator, and a controller configured to control the flow control valve thereby to control a rate of flow of oxygen to the oxygenator.

2. The perfusion system according to claim 1 wherein the controller is configured to control operation of the oxygen concentrator thereby to control a rate of flow of oxygen from the oxygen concentrator to the plenum chamber.

3. The perfusion system according to claim 2 wherein the oxygen concentrator comprises a compressor and the controller is configured to control the compressor thereby to control the rate of flow of oxygen from the oxygen concentrator to the plenum chamber.

4. The perfusion system according to claim 3 wherein the compressor is configured to pump air into the oxygen concentrator.

5. The perfusion system according to claim 2 further comprising an oxygen pressure sensor configured to measure a pressure of oxygen in the plenum chamber, wherein the oxygen pressure sensor is connected to the controller and the controller is configured to control the oxygen concentrator so as to control the pressure of oxygen in the plenum chamber.

6. The perfusion system according to claim 1 wherein the perfusion fluid circuit comprises an oxygen sensor configured to measure an oxygen content of the perfusion fluid, and the controller is connected to the oxygen sensor and configured to control a flow rate of oxygen to the oxygenator in response to the oxygen content.

7. The perfusion system according to claim 1 wherein the plenum chamber has a volume in a range from 25 ml to 250 ml.

8. The perfusion system according to claim 1 wherein the controller is configured to control the rate of flow of oxygen to the oxygenator down to a minimum of no more than 5 ml/min.

9. A method of perfusing an organ, the method comprising:
providing perfusion fluid, oxygen, an oxygenator and a plenum chamber;
pumping the perfusion fluid through the oxygenator and through the organ;
pumping the oxygen into the plenum chamber; and
controlling a flow of the oxygen from the plenum chamber to the oxygenator therefore to control an oxygen content of the perfusion fluid.

10. The method according to claim 9 further comprising measuring the oxygen content of the perfusion fluid, wherein the controlling the flow of the oxygen from the plenum chamber to the oxygenator is in response to the measured oxygen content.

11. The method according to claim 9 wherein the providing oxygen comprises providing an oxygen concentrator, and the pumping the oxygen into the plenum chamber comprises controlling the operation of the oxygen concentrator thereby to control the flow of the oxygen into the plenum chamber.

12. The method according to claim 11 wherein the oxygen concentrator comprises a compressor and controlling the operation of the oxygen concentrator comprises controlling the compressor.

13. The method according to claim 11 further comprising measuring a pressure of the oxygen in the plenum chamber, wherein the oxygen concentrator is controlled in response to the measured pressure of oxygen.

* * * * *